United States Patent
Song

[19]

[11] Patent Number: 5,943,310
[45] Date of Patent: Aug. 24, 1999

[54] TRAY CONVEYING APPARATUS FOR AN OPTICAL DISC PLAYER

[75] Inventor: Il-Joo Song, Suwon, Rep. of Korea

[73] Assignee: Samsung Electronics Co., Ltd., Rep. of Korea

[21] Appl. No.: 08/859,817

[22] Filed: May 19, 1997

[30] Foreign Application Priority Data

Oct. 30, 1996 [KR] Rep. of Korea ............... 96-50297

[51] Int. Cl.⁶ ..................................... G11B 33/02
[52] U.S. Cl. ........................................... 369/77.1
[58] Field of Search ..................... 364/77.1, 75.1, 364/75.2, 77.2, 282, 36, 38, 191; 360/96.5, 99.06

[56] References Cited

U.S. PATENT DOCUMENTS

| | | | |
|---|---|---|---|
| 2,548,603 | 4/1951 | Hallstrand | 74/440 |
| 4,066,356 | 1/1978 | Parker | 355/63 |
| 4,403,687 | 9/1983 | Stevens et al. | 198/472 |
| 5,123,005 | 6/1992 | Korosu | 369/77.1 |
| 5,218,592 | 6/1993 | Isshiki et al. | 369/75.2 |

FOREIGN PATENT DOCUMENTS 6-332079 12/1994 Japan .
8-241558 9/1996 Japan .

*Primary Examiner*—Stuart S. Levy
*Assistant Examiner*—Kenneth W. Fields
*Attorney, Agent, or Firm*—Dilworth & Barrese

[57] ABSTRACT

A tray conveying apparatus having a pair of guide racks and a pair of auxiliary racks formed on the bottom surface of a tray. A pair of support gear assemblies are engaged with the guide and auxiliary racks, and each support gear assembly has two gears having different pitches, which are engaged with the auxiliary racks when the tray is opened or closed. When the tray moves in the forward or backward direction, the support gears are engaged with the auxiliary racks, and thereby lead and guide the tray so that the tray is easily conveyed.

14 Claims, 4 Drawing Sheets

TRAY CONVEYING APPARATUS FOR AN OPTICAL DISC PLAYER

BACKGROUND OF THE INVENTION

1. Field of the Invention

The present invention relates to a tray conveying apparatus for an optical disc player, and more particularly to a tray conveying apparatus for an optical disc player in which a tray for loading or unloading a disc is slidably moved while maintaining an engagement with gears, thereby preventing the tray from malfunctioning or separating from a player body as a result of an impact applied to the disc player from outside.

2. Description of the Prior Art

Generally, in a conventional optical disc player, such as a compact disc player, a laser disc player, and a multi-disc player in which the above-mentioned disc players are combined, a disc mounted on a turn table is rotated by a spindle motor. In the bottom surface of the rotated disc, there is installed an optical pick-up device which linearly moves in the radial direction of the disc while maintaining a predetermined distance with respect to the disc so as to detect a desired track position on the disc. When the track position has been detected, a laser light from an optical system is incident on and reflected from a pit provided on the disc surface, so that a reflected light is generated. The optical disc player reproduces information recorded on the disc by detecting the reflected light as a signal source.

In such an optical disc player, as shown in FIG. 1, a tray 2 for loading or unloading a disc is installed in the inside of a player body 1 such that the tray 2 can slidably move into and out of the player body 1 of the disc player. The tray 2 is clamped by a clamping device 3 which moves upward and downward in the player body 1 of the disk player.

In addition, as shown in FIG. 2, the tray 2 is formed on the bottom surface thereof with a rack 5 which is laterally disposed on the bottom surface of the tray 2 so as to engage with a driving gear 4 which is rotated by a separate driving device (not shown). A pair of guide racks 7a and 7b, which are respectively engaged with a pair of support gears 6a and 6b for guiding the tray 2 to be conveyed, protrude from left and right end portions of the bottom surface of tray 2. Therefore, when the driving gear 4 is rotated by the separate driving device, the tray 2 is slidably moved into or out of the player body 1 by the operation of the rack 5 engaged with the driving gear 4. At this time, since the guide racks 7a and 7b, protruding from the bottom surface of the tray 2, are moved while maintaining the engagement with the support gears 6a and 6b, the slide-movement of the tray 2 can be easily attained.

However, the conventional tray conveying apparatus having the above construction has disadvantages as follows.

First, when an external impact is applied to the disc player while the tray is being moved into or out of the disc player, the guide racks engaged with the support gears can be separated from the support gears, thereby resulting in malfunction of the tray.

Furthermore, if the external impact is applied to the tray when the tray has been completely opened, the tray can be separated from the disc player body, rendering the disc player inoperable.

SUMMARY OF THE INVENTION

The apparatus of the present invention overcomes the above problems in the prior art, and accordingly, it is an object of the present invention to provide a tray conveying apparatus for an optical disc player, which prevents the tray from malfunctioning or separating from a player body as a result of an impact applied to the tray while the tray is being moved into or out of the disc player, thereby improving the reliable operation of the tray.

In order to achieve the above object of the present invention, there is provided a tray conveying apparatus for conveying a tray of an optical disc player, the tray conveying apparatus comprises: a driving gear; a rack formed on a bottom surface of the tray, the rack being moved in a forward or backward direction according to an operation of the driving gear; a plurality of guide racks for guiding the tray which is slidably moved when the rack moves; a pair of first auxiliary racks formed on a front portion of the bottom surface of the tray; a pair of second auxiliary racks formed on a rear portion of the bottom surface of the tray; and a pair of support gear assemblies engaged with the guide racks, the first auxiliary racks, and the second auxiliary racks, respectively.

BRIEF DESCRIPTION OF THE DRAWINGS

The above object, and other features and advantages of the present invention will become more apparent by the following description of preferred embodiments thereof with reference to the attached drawings in which.

DETAILED DESCRIPTION OF PREFERRED EMBODIMENT

Hereinafter, tray conveying apparatus for an optical disc player according to the preferred embodiments of the present invention will be explained in more detail with reference to the accompanying drawings.

Figure 1:
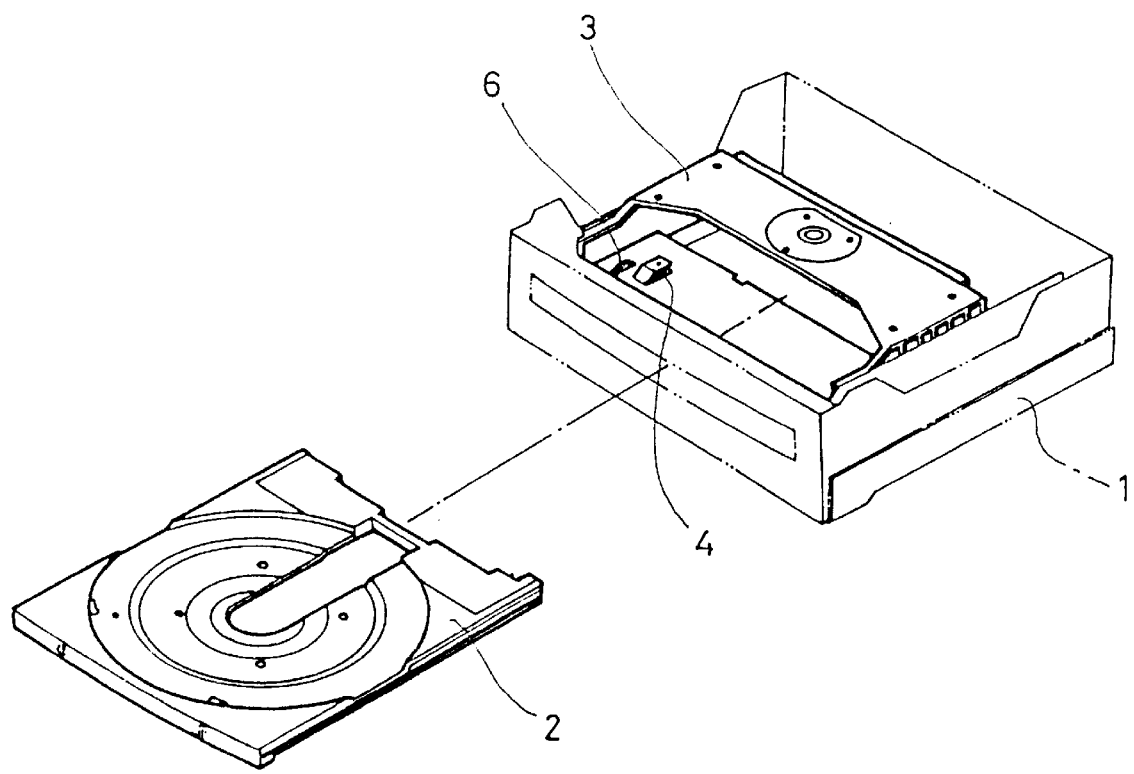
FIG. 1 is an exploded perspective view showing a conventional optical disc player.
Figure 2:
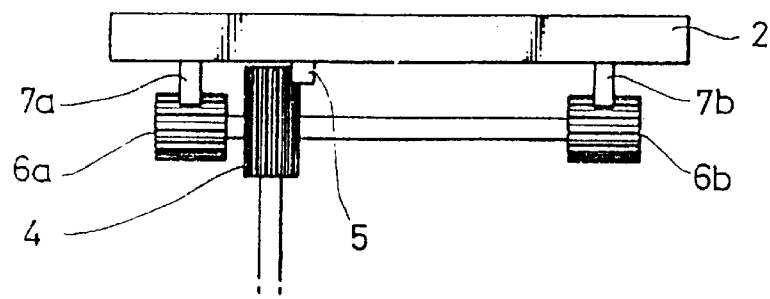
FIG. 2 is a front view showing a tray conveying apparatus assembled into a tray of the conventional optical disc player of FIG. 1.
Figure 3:
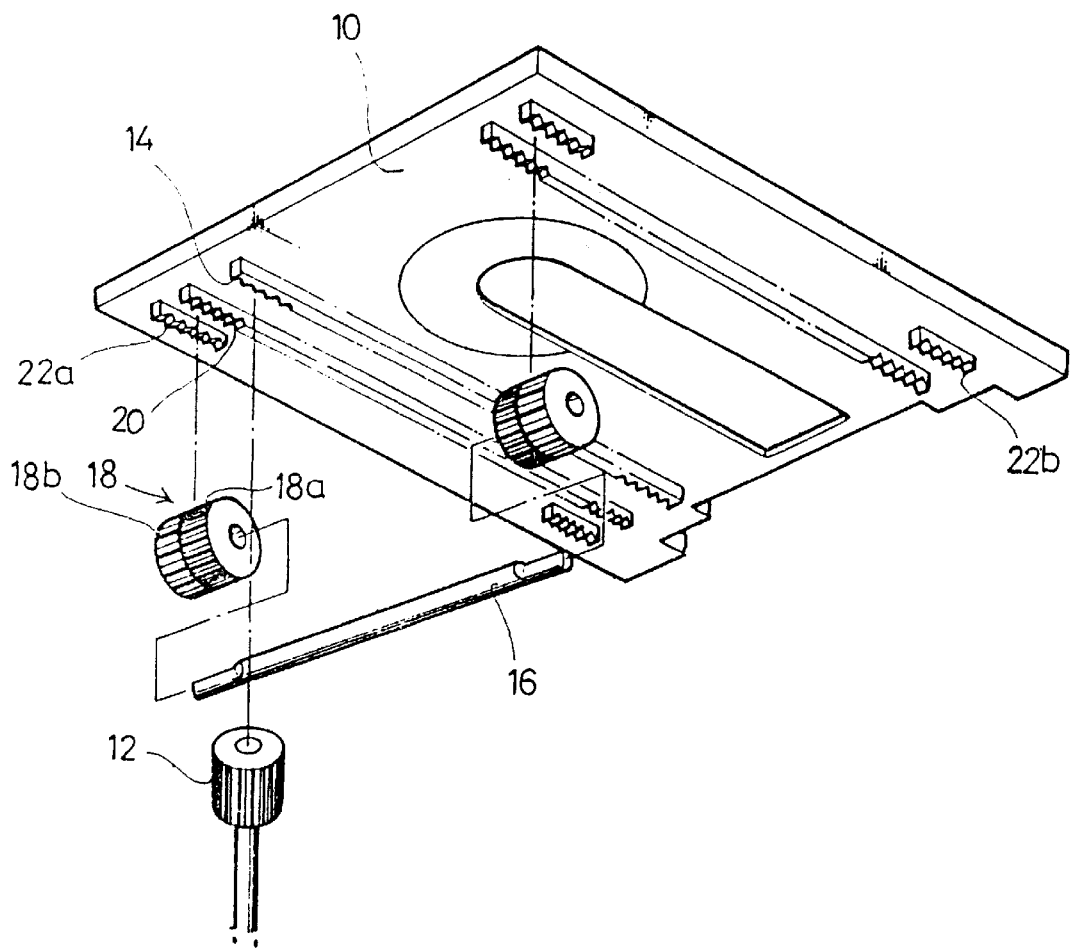
FIG. 3 is an exploded perspective view showing a tray conveying apparatus for an optical disc player according to an embodiment of the present invention.
Figure 4:
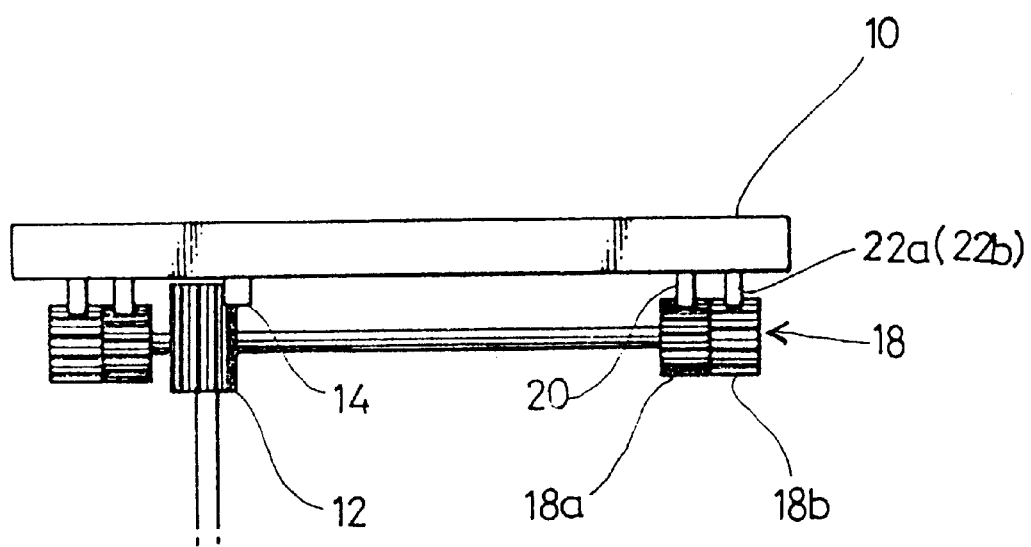
FIG. 4 is a front view showing the tray conveying apparatus assembled into a tray of the optical disc player according to the present invention.

Referring now to the drawings in detail, and initially to FIGS. 3 and 4, reference number 10 indicates the tray.

On the bottom surface of tray 10, there is provided a rack 14 which extends in the longitudinal direction of the tray 10 in such a manner that the rack 14 can be engaged with a driving gear 12 which is rotated by a driving device (not shown). Driving gear 12 is positioned substantially orthogonal to the plane of the bottom surface of tray 10. In addition, a pair of guide racks 20, which are engaged with a pair of support gear assemblies 18, are provided at the left and right sides about the rack 14, and extend in the longitudinal direction of the tray 10. The support gear assemblies 18 are respectively fixed to both ends of a connecting shaft 16 so that they can rotate at the same angular velocity with respect to each other.

Each support gear assembly 18 includes two gears having different pitches with each other. That is, each support gear assembly 18 includes a first support gear 18a and a second support gear 18b coupled to the first support gear 18a, in which the first support gear 18a has a smaller pitch than the second support gear 18b, and the second support gear 18b has fewer teeth than the first support gear 18a.

First support gear 18a is engaged with the guide rack 20, so the tray 10 can be easily and precisely guided in the forward and backward directions.

In addition, a pair of first auxiliary racks 22a and a pair of second auxiliary racks 22b are respectively provided at the front and rear portions of the bottom surface of the tray 10 in such a manner that the first and second auxiliary racks 22a and 22b can be engaged with the second support gear 18b of the support gear assembly 18.

Since the first and second auxiliary racks 22a and 22b are engaged with the second support gear 18b when the tray 10 is in the open or closed position, the tray 10 is stably maintained even when the an external impact is applied thereto. Thus, a reliable operation of the tray 10 is attained.

Preferably, each of the first and second auxiliary racks 22a and 22b have at least two teeth respectively, and more preferably, the first and second auxiliary racks 22a and 22b have three teeth respectively. In this case, the tray 10 can be stably opened and closed.

In the tray conveying apparatus for an optical disc player according to an embodiment of the present invention, the conveying operation of the tray 10 for loading or unloading the optical disc is well known and is usually attained by manipulating a separate switch which is in electrical communication with driving devices.

During the opening operation of the tray 10, the driving force of the driving device is transferred to the driving gear 12, thereby rotating the driving gear 12. As the driving gear 12 rotates, the rack 14 engaged with the driving gear 12 is moved forward so that the tray 10 is conveyed forward.

At this time, the guide racks 20, protruding from the bottom surface of the tray 10, are conveyed in a forward direction while maintaining the engagement with the first support gear 18a of the support gear assembly 18, and the second support gear 18b of the support gear assembly 18 rotates together with the first support gear 18a.

Support gears 18b are engaged with the second auxiliary racks 22b when the tray 10 is completely closed, and are engaged with the first auxiliary racks 22a when the tray 10 is completely opened, so that the tray 10 can be reliably engaged with the driving gear 12 or support gears 18a and stably maintained therewith even when an external impact is applied to the tray 10 during the opening and closing operation of the tray 10.

On the other hand, during the closing operation of the tray 10, the tray 10 is moved backward by the operation of the driving gear 12. At this time, the tray 10 is inserted into the body of the optical disc player by the conveying operation of the guide racks 20 which are engaged with the first support gear 18a of the support gear assembly 18.

When the tray 10 is completely closed, the second support gears 18b of the support gear assemblies 18 are engaged with the first auxiliary racks 22a so that tray 10 is stably maintained therewith, even when an impact is applied to the tray 10, thereby not only preventing malfunction of the tray 10, but also improving the reliable operation of the tray 10.

Figure 5:
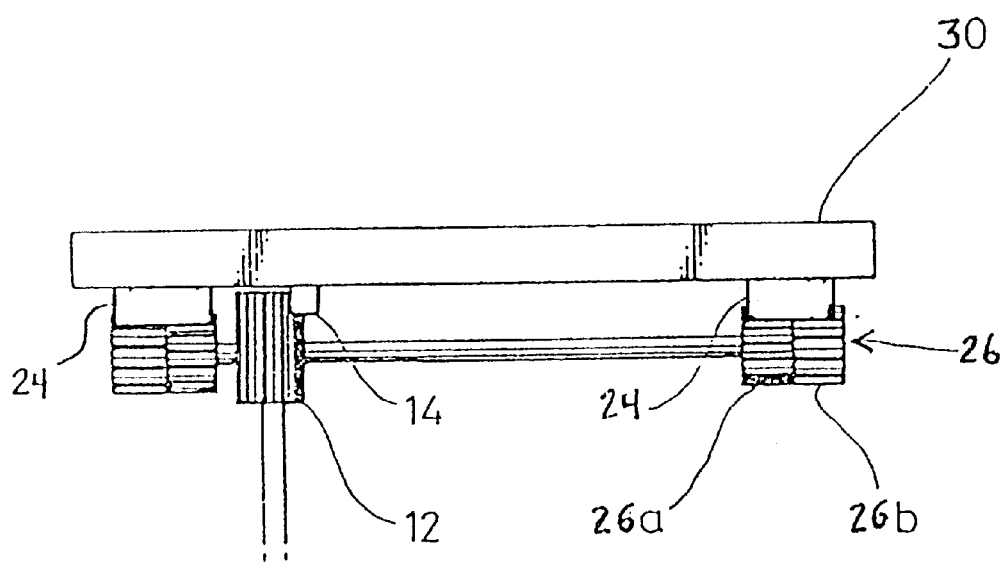
FIG. 5 is a front view showing the tray conveying apparatus having guide racks corresponding in width to the width of their mating support gears.

Referring now to FIG. 5, an embodiment of the present invention is illustrated wherein the width of racks 24 substantially corresponds to the width of support gear assemblies 26. The ratio of the width of rack 24 to the width of support gear assembly 26 is substantially close to or equal to one. Advantageously, the contact surface area between racks 24 and support gear assemblies 26 is increased to enhance the support of tray 30. Therefore, tray 30 is capable of withstanding an increased amount of torque exerted by external impacts, while still maintaining proper alignment. Preferably, support gear assemblies 26 include a uniform pitch to engage racks 24. However, it is also contemplated that gear assemblies 26 may include gears 26a and 26b, wherein gears 26a have a pitch smaller than the pitch of gears 26b and the teeth on racks 24 are configured to correspond thereto.

As described above, according to the present invention, support gears are engaged with the first and second auxiliary racks when the tray is completely opened or closed as well as when the tray is slidably moving, so the tray is prevented from malfunctioning and separating from the disc player body as a result of impacts applied to the tray, thereby improving the reliable operation of the tray.

The drawings and specification disclose preferred embodiments of the present invention and, although specific terms are employed, they are used in a generic and descriptive sense only and not for purposes of limitation. Various changes and modifications may be affected to the embodiments disclosed herein by one skilled in the art without departing from the scope or spirit of the invention. All such changes and modifications are intended to be included within the scope of the invention as set forth by the following claims.

What is claimed is:

1. A tray conveying apparatus for conveying a tray of an optical disc player, the tray conveying apparatus comprising:
    a driving gear;
    a rack formed on a bottom surface of the tray, the rack being moved in a forward or backward direction according to an operation of the driving gear;
    a plurality of guide racks formed on the bottom surface of the tray for guiding the tray which is slidably moved when the rack moves;
    a pair of first auxiliary racks formed on a front portion of the bottom surface of the tray adjacent and substantially parallel to at least one of the plurality of guide racks;
    a pair of second auxiliary racks formed on a rear portion of the bottom surface of the tray adjacent and substantially parallel to at least one of the plurality of guide racks; and
    a pair of support gear assemblies for engagement with the guide racks, the first auxiliary racks, and the second auxiliary racks.

2. The tray conveying apparatus as claimed in claim 1, wherein each support gear assembly includes a first support gear and a second support gear.

3. The tray conveying apparatus as claimed in claim 2, wherein one of the first and second support gears is engaged with one of the first and second auxiliary racks when the tray is in an opened or a closed position.

4. The tray conveying apparatus as claimed in claim 2, wherein the second support gear of each support gear assembly is engaged with one of the first and second auxiliary racks when the tray is in an opened or a closed position.

5. The tray conveying apparatus as claimed in claim 2, wherein the first support gear is coupled to the second support gear.

6. The tray conveying apparatus as claimed in claim 2, wherein the first support gear has a pitch smaller than a pitch of the second support gear.

7. The tray conveying apparatus as claimed in claim 1, wherein the guide rack has at least two teeth.

8. The tray conveying apparatus as claimed in claim 1, wherein the driving gear is substantially orthogonal to a plane of the tray.

9. A tray conveying apparatus for conveying a tray of an optical disc player, the tray conveying apparatus comprising:
   a driving gear;
   a rack formed on a bottom surface of the tray, the rack being moved in a forward or backward direction according to an operation of the driving gear;
   at least two guide racks formed on the bottom surface of the tray for guiding the tray which is slidably moved when the rack moves; and
   at least two support gear assemblies for engagement with the at least two guide racks, wherein a ratio of a width of the at least two guide racks to a width of the at least two support gear assemblies is substantially equal to one;
   wherein each of the at least two support gear assemblies includes a first support gear and a second support gear.

10. A tray conveying apparatus as recited in claim 9, wherein the first support gear is coupled to the second support gear.

11. A tray conveying apparatus as recited in claim 9, wherein the first support gear has a pitch smaller than a pitch of the second support gear.

12. A tray conveying apparatus as recited in claim 9, wherein the rack has at least two teeth.

13. A tray conveying apparatus as recited in claim 9, wherein the at least two guide racks has at least two teeth.

14. A tray conveying apparatus as recited in claim 9, wherein the driving gear is substantially orthogonal to a plane of the tray.

\* \* \* \* \*